United States Patent
Takahashi

(10) Patent No.: US 10,958,831 B2
(45) Date of Patent: Mar. 23, 2021

(54) IMAGE PROCESSING APPARATUS AND CONTROL METHOD OF THE SAME

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/579,670

(22) Filed: Sep. 23, 2019

(65) Prior Publication Data
US 2020/0106985 A1    Apr. 2, 2020

(30) Foreign Application Priority Data
Sep. 28, 2018    (JP) .............................. JP2018-184792

(51) Int. Cl.
| | |
|---|---|
| H04N 5/232 | (2006.01) |
| H04N 5/262 | (2006.01) |
| H04N 1/00 | (2006.01) |
| H04N 1/21 | (2006.01) |
| H04N 1/32 | (2006.01) |
| H04N 101/00 | (2006.01) |

(52) U.S. Cl.
CPC ..... *H04N 5/23229* (2013.01); *H04N 1/00458* (2013.01); *H04N 1/00461* (2013.01); *H04N 1/215* (2013.01); *H04N 1/32128* (2013.01); *H04N 5/232933* (2018.08); *H04N 5/232939* (2018.08); *H04N 5/2628* (2013.01); *H04N 2101/00* (2013.01); *H04N 2201/0084* (2013.01); *H04N 2201/325* (2013.01)

(58) Field of Classification Search
CPC . H04N 1/0044–00461; H04N 5/23293; H04N 5/232933; H04N 5/232939; H04N 2201/325
See application file for complete search history.

(56) References Cited

U.S. PATENT DOCUMENTS

| | | | | |
|---|---|---|---|---|
| 2008/0082919 A1* | 4/2008 | Kojima | .................. | G11B 27/34 715/700 |
| 2008/0279468 A1* | 11/2008 | Shiohara | .............. | H04N 1/0044 382/254 |
| 2015/0103202 A1* | 4/2015 | Otsuki | ............... | H04N 5/23245 348/231.2 |
| 2015/0103204 A1* | 4/2015 | Suzuki | .................. | H04N 1/212 348/231.3 |

(Continued)

FOREIGN PATENT DOCUMENTS

JP    2016-82546 A    5/2016

*Primary Examiner* — Paul M Berardesca
(74) *Attorney, Agent, or Firm* — Canon U.S.A., Inc. IP Division

(57) ABSTRACT

An image that is based on an image with a first resolution is displayed on a selection screen, a display unit is caused to display a confirmation screen for confirming a processing target image selected on the selection screen, control is performed to generate an image with a second resolution higher than the first resolution and to display the generated image on the confirmation screen, and control is performed to extract an image having a first format and corresponding to the processing target image from a first image file, and to record the extracted image and the image with the second resolution, as a second image file.

20 Claims, 8 Drawing Sheets

(56) References Cited

U.S. PATENT DOCUMENTS

2015/0334296 A1* 11/2015 Gunji .................. H04N 9/8205
386/225
2020/0105302 A1* 4/2020 Kano .................. G11B 27/034

* cited by examiner

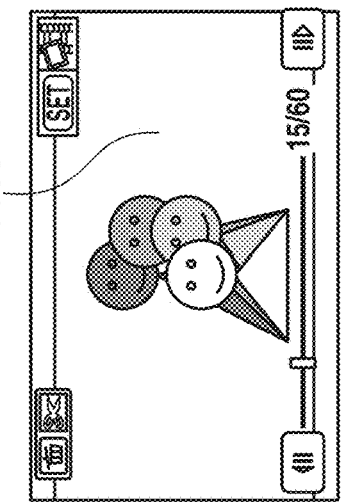
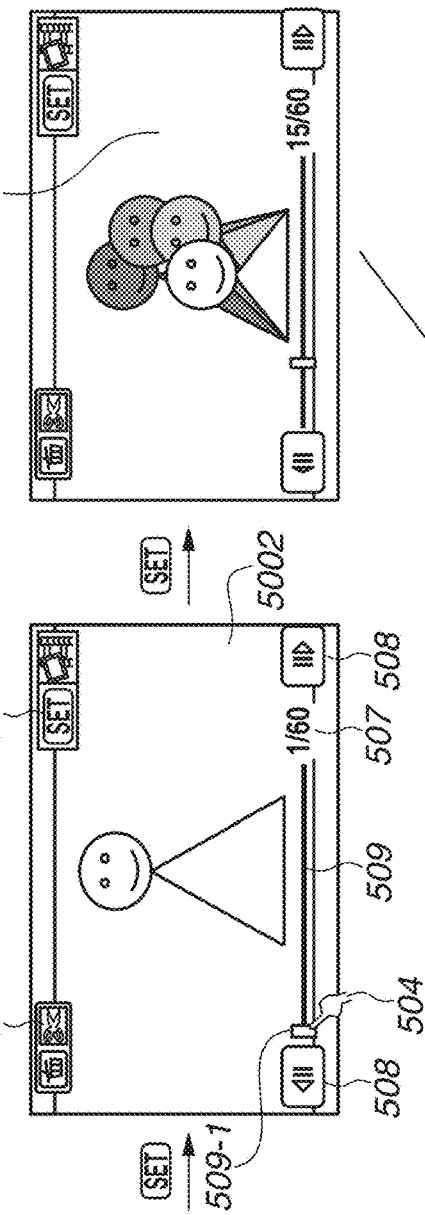
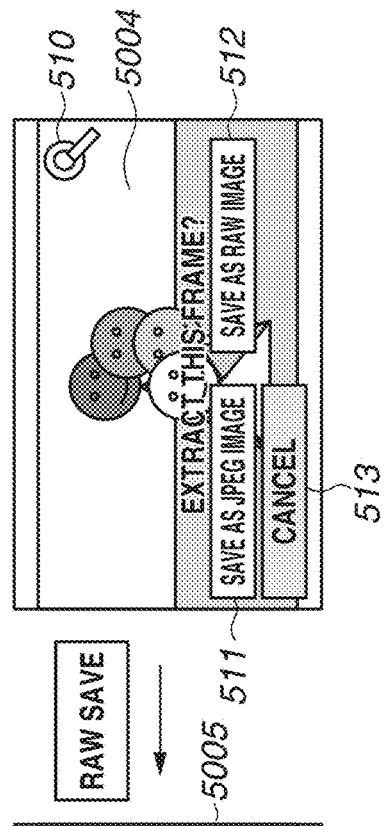
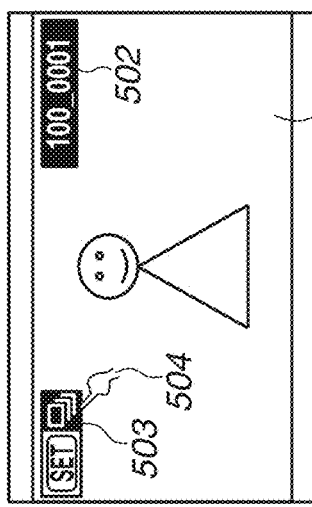
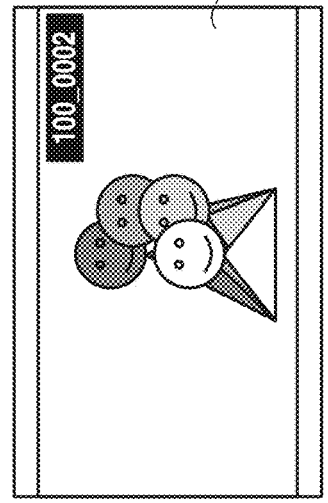

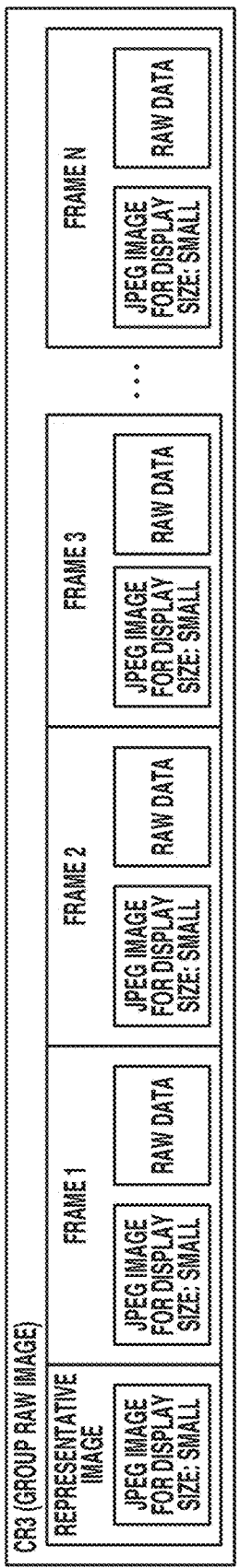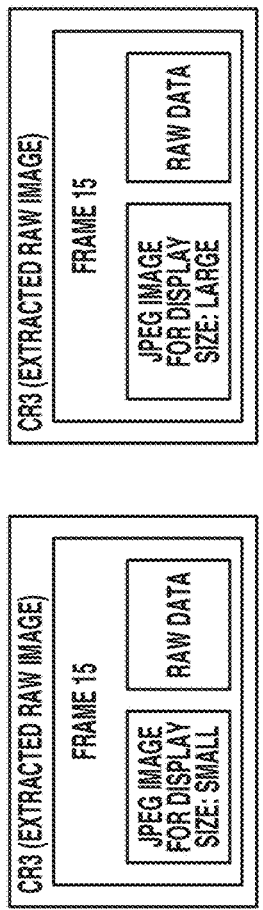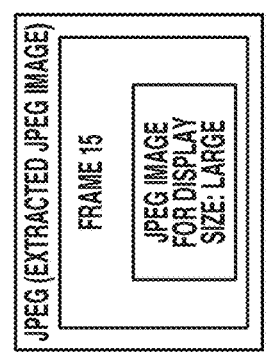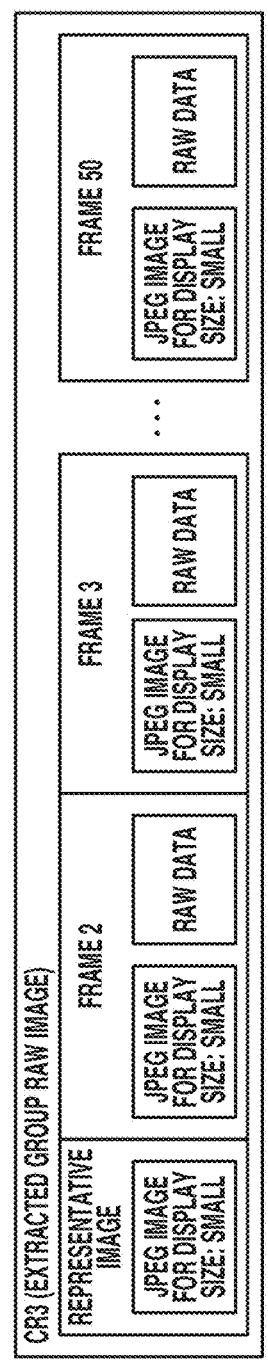

IMAGE PROCESSING APPARATUS AND CONTROL METHOD OF THE SAME

BACKGROUND

Field

The present disclosure relates to an image processing apparatus that performs processing of extracting an image to be processed, from an image file including a plurality of images.

Description of the Related Art

Conventionally, it has been common to use a mechanical shutter system in an imaging apparatus such as a digital camera. In recent years, due to the enhancement in performance of an image sensor, a growing number of imaging apparatuses use an electronic shutter system. The electronic shutter system is advantageous in performing image capturing especially under tranquil environment because the electronic shutter system does not emit shutter tone in image capturing unlike the mechanical shutter system. In addition, due to the increase in readout speed, the electronic shutter system needs not move a mechanism as in the mechanical shutter system, and can also perform image capturing corresponding to several tens of frames in one second. In view of such a background, there has been recently developed a digital camera that can perform image capturing corresponding to several tens of frames in one second. Nevertheless, in such a device, because it is necessary to perform image capturing corresponding to several tens of frames (e.g. 30 frames) in one second in image capturing, it is necessary to omit processing such as Joint Photographic Experts Group (JPEG) compression and file generation, which are types of processing to be performed after image capturing. Thus, frame data of each of the 30 frames obtained in one second is saved as RAW data, and compression processing such as JPEG development is not performed. In addition, because it is necessary to save thumbnail data for display from the RAW data, a thumbnail in a record size reduced from a size set in image capturing is embedded into each frame. Such a structure saves a processing time taken for the entire image capturing. Hereinafter, data of a plurality of frames generated as one combined file will be referred to as group RAW data or a group RAW image.

Nevertheless, because an image for display of each frame in such group RAW data is an image embedded in a small size as described above, if the image of each frame is reproduced in an enlarged manner for confirming details such as focus, the image is not tolerable for enlargement. Thus, for confirming details, it is necessary to perform development processing from RAW data of each frame. In this case, it is necessary to perform procedures of saving an image of a frame as a new file, and then, further reproducing the image in an enlarged manner, and confirming the enlarged image, which is not user-friendly. In addition, in a process of selecting a favorite frame (most desirable frame) from among group RAW data, better retrieval performance and browse performance can be obtained by using small images rather than performing development processing for each frame and taking time in processing. Thus, in an operation flow of extracting one frame from group RAW data, determination of an execution timing of development processing following frame selection and an execution timing of file save processing has remained as an issue. In Japanese Patent Application Laid-Open No. 2016-82546, when a frame is selected, small images are used, and after the frame selection ends, development processing is performed from raw data linked to the small images, and processes up to file generation processing are simultaneously performed.

SUMMARY

According to an aspect of the present disclosure, there is provided an image processing apparatus including a readout control unit configured to read out an image from a recording medium on which a first image file is recorded, the first image file including a first plurality of images having a first format, and a second plurality of images with a first resolution that respectively corresponds to the first plurality of images, a first display control unit configured to cause a display unit to display a selection screen for selecting a processing target image from among a third plurality of images in the first image file, and cause an image that is based on an image with the first resolution, to be displayed on the selection screen, a second display control unit configured cause the display unit to display a confirmation screen for confirming the processing target image, in accordance with the processing target image being selected on the selection screen, and a recording control unit configured to perform control to extract an image having the first format and corresponding to the processing target image, from the first image file, and to record the extracted image onto the recording medium as a second image file, in accordance with extraction of the processing target image being selected on the confirmation screen. The second display control unit performs control to generate an image with a second resolution higher than the first resolution, from the image having the first format and corresponding to the processing target image, and to display an image that is based on the image with the second resolution, on the confirmation screen, and the recording control unit performs control to record, as the second image file, the image having the first format and corresponding to the processing target image that has been extracted from the first image file, and the image with the second resolution that has been generated to be displayed on the confirmation screen.

Further features of the present disclosure will become apparent from the following description of exemplary embodiments with reference to the attached drawings.

BRIEF DESCRIPTION OF THE DRAWINGS

FIGS. 5A, 5B, 5C, 5D, and 5E are screen transition diagrams in a reproduction mode.

FIGS. 8A, 8B, 8C, 8D, and 8E are explanatory diagrams of a file configuration.

DESCRIPTION OF THE EMBODIMENTS

Hereinafter, exemplary embodiments of the present disclosure will be described with reference to the drawings.

Figure 1:
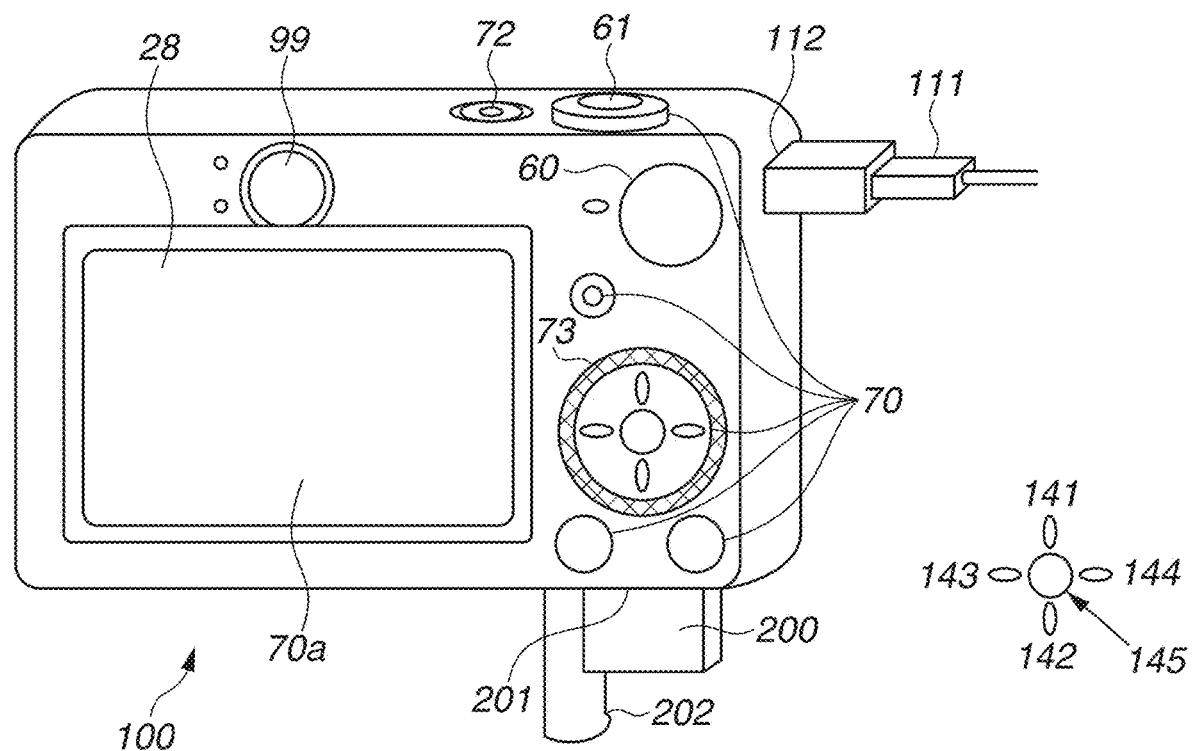
FIG. 1 is a diagram illustrating an external appearance of a digital camera.

FIG. 1 illustrates an external view of a digital camera serving as an example of an apparatus to which the present disclosure can be applied. A display unit 28 is a display unit that displays an image and various types of information. A shutter button 61 is an operation unit for issuing an image capturing instruction. A mode selection switch 60 is an operation unit for switching between various modes. A connector 112 connects between a digital camera 100 and a connection cable 111 for connecting the digital camera 100 with an external device such as a personal computer or a printer. An operation unit 70 includes operation members such as various switches for receiving various operations from a user, buttons, and a touch panel. A controller wheel 73 is a rotationally-operable operation member included in the operation unit 70. A power switch 72 is a press button for switching between power on and power off. A recording medium 200 is a recording medium such as a memory card or a hard disc. A recording medium slot 201 is a slot for storing the recording medium 200. The recording medium 200 stored in the recording medium slot 201 is enabled to communicate with the digital camera 100 so that the digital camera 100 can record data into or reproduce data from the recording medium 200. A lid 202 is a lid of the recording medium slot 201. FIG. 1 illustrates a state in which the lid 202 is opened and a part of the recording medium 200 is taken out from the recording medium slot 201 and exposed.

Figure 2:
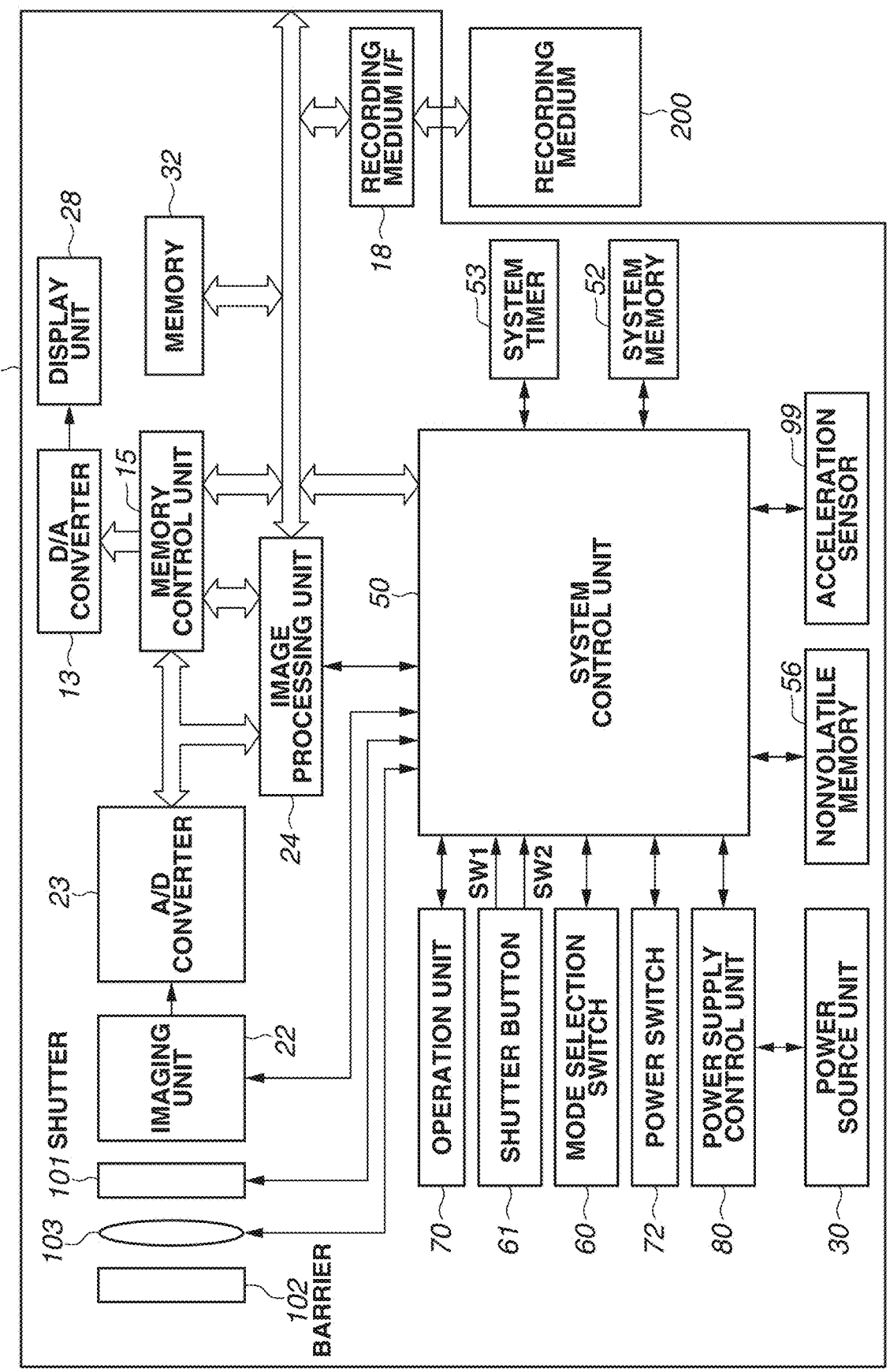
FIG. 2 is a diagram illustrating a hardware configuration of the digital camera.

FIG. 2 is a block diagram illustrating a configuration example of the digital camera 100 according to the present exemplary embodiment.

In FIG. 2, an imaging lens 103 is a lens unit including a zoom lens and a focus lens. A shutter 101 is a shutter having an aperture function. An imaging unit 22 is an image sensor including a charge-coupled device (CCD) sensor, a complementary metal-oxide semiconductor (CMOS) sensor, or the like that converts an optical image into an electrical signal. An analog-to-digital (A/D) converter 23 converts an analog signal into a digital signal. The A/D converter 23 is used for converting an analog signal output from the imaging unit 22, into a digital signal. A barrier 102 prevents an imaging system including the imaging lens 103, the shutter 101, and the imaging unit 22 from being dirtied or broken, by covering the imaging system (including the imaging lens 103) of the digital camera 100.

An image processing unit 24 performs resize processing such as predetermined pixel interpolation or reduction, and color conversion processing on data from the A/D converter 23 or data from a memory control unit 15. In addition, the image processing unit 24 performs predetermined calculation processing using data of a captured image, and a system control unit 50 performs exposure control and ranging control based on the obtained calculation result. Through-the-lens (TTL) system autofocus (AF) processing, automatic exposure (AE) processing, and flash preliminary emission (EF) processing are thus performed. The image processing unit 24 further performs predetermined calculation processing using data of a captured image, and also performs TTL system automatic white balance (AWB) processing based on the obtained calculation result.

Output data from the A/D converter 23 is written into a memory 32 via the image processing unit 24 and the memory control unit 15, or directly via the memory control unit 15. The memory 32 stores image data obtained by the imaging unit 22 and converted by the A/D converter 23 into digital data, and image data to be displayed on the display unit 28. The memory 32 has a storage capacity sufficient for storing a predetermined number of still images, and a predetermined time length of a moving image and voice.

In addition, the memory 32 also serves as a memory (video memory) for image display. A digital-to-analog (D/A) converter 13 converts data for image display that is stored in the memory 32, into an analog signal, and supplies the analog signal to the display unit 28. In this manner, the image data for display that has been written into the memory 32 is displayed by the display unit 28 via the D/A converter 13. The display unit 28 performs display in accordance with the analog signal supplied from the D/A converter 13, on a display device such as a liquid crystal display (LCD). The digital signals having been once A/D-converted by the A/D converter 23 and stored in the memory 32 are converted into analog signals by the D/A converter 13, and the resultant analog signals are sequentially transferred to the display unit 28 and displayed by the display unit 28. The display unit 28 can thus function as an electronic viewfinder and perform live view display.

A nonvolatile memory 56 is a memory serving as an electrically erasable/recordable recording medium. For example, an electrically erasable programmable read-only memory (EEPROM) or the like is used as the nonvolatile memory 56. Constants for operating the system control unit 50, programs, and the like are stored in the nonvolatile memory 56. The programs referred to herein are computer programs for executing various flowcharts to be described below in the present exemplary embodiment.

The system control unit 50 is a control unit including at least one processor, and controls the entire digital camera 100. More specifically, the system control unit 50 performs not only imaging control for capturing an image, but also readout control of data from the recording medium 200, recording control regarding the generation and the recording of data to be recorded onto the recording medium 200, display control for displaying an image and a display screen on the display unit 28. By executing the above-described program recorded in the nonvolatile memory 56, the system control unit 50 implements each piece of processing in the present exemplary embodiment, which will be described below. A random access memory (RAM) is used as a system memory 52. Constants for operating the system control unit 50, variables, programs read out from the nonvolatile memory 56, and the like are loaded into the system memory 52. In addition, the system control unit 50 also performs display control by controlling the memory 32, the D/A converter 13, the display unit 28, and the like.

A system timer 53 is a time measuring unit for measuring a time used for various types of control or a time of a built-in clock.

The mode selection switch 60, the shutter button 61, and the operation unit 70 serve as an operating unit for inputting various operation instructions to the system control unit 50.

The mode selection switch 60 switches an operation mode of the system control unit 50 to any of a still image recording mode, a moving image capturing mode, a reproduction mode, and the like. The still image recording mode includes modes such as an automatic image capturing mode, an automatic scene determination mode, a manual mode, an aperture priority mode (Av mode), and a shutter speed priority mode (Tv mode). In addition, the still image recording mode further include modes such as various scene modes having different image capturing settings for respective image capturing scenes, a program AE mode, and a custom mode. The mode selection switch 60 directly switches the operation mode to any of these modes. Alternatively, an operation mode may be switched in the following manner. First, a screen is switched to a list screen of image capturing modes using the mode selection switch 60.

Then, any of a plurality of displayed modes is selected using another operation member so that an operation mode is switched to the selected mode. In a similar manner, the moving image capturing mode may include a plurality of modes.

A first shutter switch 62 is turned ON in the middle of an operation of the shutter button 61 provided on the digital camera 100. That is to say, the first shutter switch 62 is turned ON by so-called half press (i.e. an image capturing preparation instruction), and generates a first shutter switch signal SW1. An operation of AF processing, AE processing, AWB processing, EF processing, or the like is started in response to the first shutter switch signal SW1.

A second shutter switch 64 is turned ON upon the completion of an operation of the shutter button 61. That is to say, the second shutter switch 64 is turned ON by so-called full press (i.e. image capturing instruction), and generates a second shutter switch signal SW2. In response to the second shutter switch signal SW2, the system control unit 50 starts operations of a series of image capturing processes starting from the readout of a signal from the imaging unit 22 up to writing of image data onto the recording medium 200.

The operation members of the operation unit 70 are respectively assigned appropriate functions for each scene by selectively operating various functional icons displayed on the display unit 28, for example, so as to act as various functional buttons. Examples of the functional buttons include an end button, a return button, an image feeding button, a jump button, a narrowing-down button, and an attribute change button. For example, when a menu button is pressed, a menu screen for enabling various settings to be performed is displayed on the display unit 28. The user can intuitively perform various settings using the menu screen displayed on the display unit 28, four-direction (up, down, left, and right) buttons, and a SET button. The four-direction buttons are defined to include an up button 141, a down button 142, a left button 143, a right button 144, and a SET button 145.

The controller wheel 73 is a rotationally-operable operation member included in the operation unit 70, and is used together with the directional buttons for instructing a selected item, for example. When the controller wheel 73 is rotationally operated, an electrical pulse signal is generated in accordance with an operation amount, and the system control unit 50 controls each unit of the digital camera 100 based on this pulse signal. Based on this pulse signal, an angle by which the controller wheel 73 has been rotationally operated and how many rotations have been made can be determined. The controller wheel 73 may be any operation member as long as a rotational operation can be detected. For example, the controller wheel 73 may be a dial operation member that generates a pulse signal by rotating in accordance with a rotational operation of the user. Alternatively, the controller wheel 73 may be an operation member including a touch sensor (so-called touch wheel), and detecting a rotational operation or the like of a finger of the user that is performed on the controller wheel 73, without rotating.

A power supply control unit 80 includes a battery detecting circuit, a direct current (DC)-DC converter, and a switch circuit for switching a block to be supplied with power. The power supply control unit 80 detects whether a battery is attached, the type of the battery, and remaining battery capacity. In addition, the power supply control unit 80 controls the DC-DC converter based on the detection result and an instruction from the system control unit 50, and supplies necessary voltage to components including the recording medium 200 for a necessary time period.

A power source unit 30 includes a primary battery such as an alkaline battery or a lithium battery, a secondary battery such as a nickel-cadmium (NiCd) battery, a nickel-metal hydride (NiMH) battery, or a lithium (Li) battery, and an alternating current (AC) adapter. A recording medium interface (I/F) 18 is an interface to the recording medium 200 such as a memory card or a hard disc. The recording medium 200 is a recording medium such as a memory card for recording a captured image, and includes a semiconductor memory, an optical disc, a magnetic disc, or the like.

A communication unit 54 is connected wirelessly or via a wired cable, and transmits or receives a video signal, an audio signal, or the like. The communication unit 54 can be connected with a wireless local area network (LAN) and the Internet. The communication unit 54 can transmit an image (including a live view) captured by the imaging unit 22 and an image recorded on the recording medium 200. In addition, the communication unit 54 can receive image data and other various types of information from an external device.

An orientation detection unit 55 detects the orientation of the digital camera 100 with respect to a direction of gravitational force. Based on the orientation detected by the orientation detection unit 55, it can be determined whether an image captured by the imaging unit 22 is an image captured with the digital camera 100 being held in a traverse direction or an image captured with the digital camera 100 being held in a longitudinal direction. The system control unit 50 can add orientation information corresponding to the orientation detected by the orientation detection unit 55, to an image file of an image captured by the imaging unit 22, or record an image with being rotated. An acceleration sensor, a gyro sensor, or the like can be used as the orientation detection unit 55.

A touch panel 70a that can detect a touch performed on the display unit 28 is included as one operation member of the operation unit 70. The touch panel 70a and the display unit 28 can be integrally formed. For example, the touch panel 70a is configured to have light transmittance that does not disturb display performed on the display unit 28, and is attached to the top layer of a display surface of the display unit 28. Then, an input coordinate on the touch panel 70a and a display coordinate on the display unit 28 are associated with each other. This structure can form a graphical user interface (GUI) that performs display as if the user could directly operate a screen displayed on the display unit 28. The system control unit 50 can detect the following operations performed on the touch panel 70a or the states thereof.

An operation of a finger or a stylus that has not been in touch with the touch panel 70a newly touching the touch panel 70a, i.e. the start of a touch on the touch panel 70a (hereinafter, referred to as "Touch-Down").

A state in which a finger or a stylus is in touch with the touch panel 70a (hereinafter, referred to as "Touch-On").

An operation of a finger or a stylus moving while being in touch with the touch panel 70a (hereinafter, referred to as "Touch-Move").

The detachment of a finger or a stylus that has been in touch with the touch panel 70a, i.e. the end of a touch on the touch panel 70a (hereinafter, referred to as "Touch-Up").

A state in which nothing touches the touch panel 70a (hereinafter, referred to as "Touch-Off").

If the Touch-Down is detected, the Touch-On is simultaneously detected. After the Touch-Down, normally, the Touch-On continues to be detected until the Touch-Up is detected. The Touch-Move is detected in the state in which the Touch-On is detected. Even if the Touch-On is detected, the Touch-Move is not detected unless a touch position moves. After the Touch-Up of all the fingers or styluses that have been in touch is detected, the Touch-Off is detected.

These operation states and a position coordinate on the touch panel 70a on which a finger or a stylus touches are notified to the system control unit 50 via an internal bus, and the system control unit 50 determines, based on the notified information, what type of operation (touch operation) has been performed on the touch panel 70a. As for the Touch-Move, a moving direction of a finger or a stylus moving on the touch panel 70a can also be determined for each perpendicular component/horizontal component on the touch panel 70a based on a change in position coordinate. If it is detected that the Touch-Move is performed for a predetermined distance or more, it is determined that a slide operation has been performed. An operation of swiftly moving a finger by a certain amount of distance with the finger being in touch with a touch panel, and detaching the finger in this state will be referred to as a flick. In other words, the flick is an operation of swiftly moving the finger over the touch panel 70a like a flip. If it is detected that the Touch-Move has been performed at a predetermined speed or more for a predetermined distance or more, and the Touch-Up is detected in this state, it can be determined that a flick has been performed (it can be determined that a flick has been performed subsequent to the slide operation). Furthermore, a touch operation of simultaneously touching a plurality of locations (e.g. two points), and bringing the touch positions closer to each other will be referred to as "pinch-in", and a touch operation of bringing the touch positions away from each other will be referred to as "pinch-out". The pinch-out and the pinch-in will be collectively referred to as a pinch operation (or simply "pinch"). As the touch panel 70a, a touch panel of any of the following various types may be used: a resistive touch panel, a capacitive touch panel, a surface acoustic wave touch panel, an infrared touch panel, an electromagnetic induction type touch panel, an image recognition type touch panel, and an optical sensor type touch panel. Depending on the types, some touch panels detect a touch upon detecting contact with the touch panels while the other touch panels detect a touch upon detecting the approach of a finger or a stylus to the touch panels. A touch panel of any type of them may be used.

Figure 3:
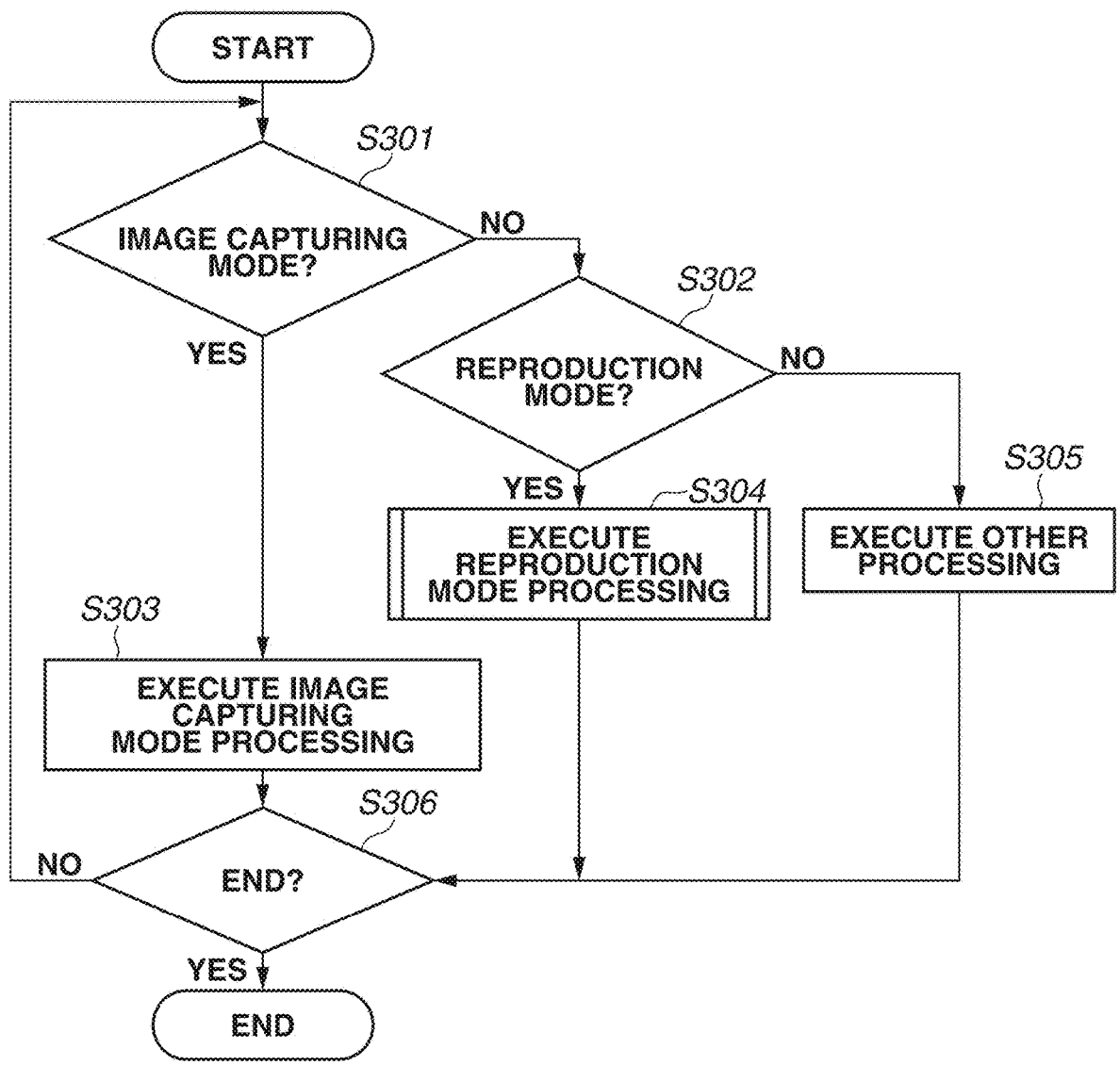
FIG. 3 is a flowchart illustrating a flow from activation to end of the digital camera.

FIG. 3 is a flowchart illustrating a basic flow from activation to end of the digital camera.

After the camera activation, the processing proceeds to step S301. In step S301, whether an image capturing mode is set is determined based on the position of the mode selection switch 60. If it is determined that the image capturing mode is set (YES in step S301), the processing proceeds to step S303, and if it is determined that the image capturing mode is not set (NO in step S301), the processing proceeds to step S302. In step S302, whether a reproduction mode is set is determined based on the position of the mode selection switch 60. If it is determined that the reproduction mode is set (YES in step S302), the processing proceeds to step S304, and if it is determined that the reproduction mode is not set (NO in step S302), the processing proceeds to step S305. In step S303, the processing of the image capturing mode is performed. The processing of the image capturing mode includes still image capturing and moving image capturing. In step S304, the processing of the reproduction mode is performed. In the reproduction mode processing, captured still images and moving images are mainly browsed, erased, or edited. In the undermentioned exemplary embodiment, the details will be described using, as an example, processing of group reproduction of browsing the content of the aforementioned group RAW data. In step S305, other processing is performed. Examples of the other processing include processing to be performed in a clock display mode in which a current time is simply displayed. If each piece of mode processing ends, the processing proceeds to step S306, in which it is determined whether to shut down a camera operation. If it is determined that the camera operation is to be shut down (YES in step S306), the camera operation is ended, and if it is determined that the camera operation is not to be shut down (NO in step S306), the processing proceeds to step S301.

The processing of the reproduction mode will be described using flowcharts in FIGS. 4 and 7, diagrams in FIGS. 5A, 5B, 5C, 5D, 5E, 6A, and 6B that illustrate screens in the reproduction mode, and file configuration diagrams in FIGS. 8A, 8B, 8C, 8D, and 8E. In the reproduction mode, it is possible to browse a plurality of frame images stored in a group RAW image file, extract a frame selected from a group RAW image, and save the extracted frame as a new RAW image file.

Figure 4:
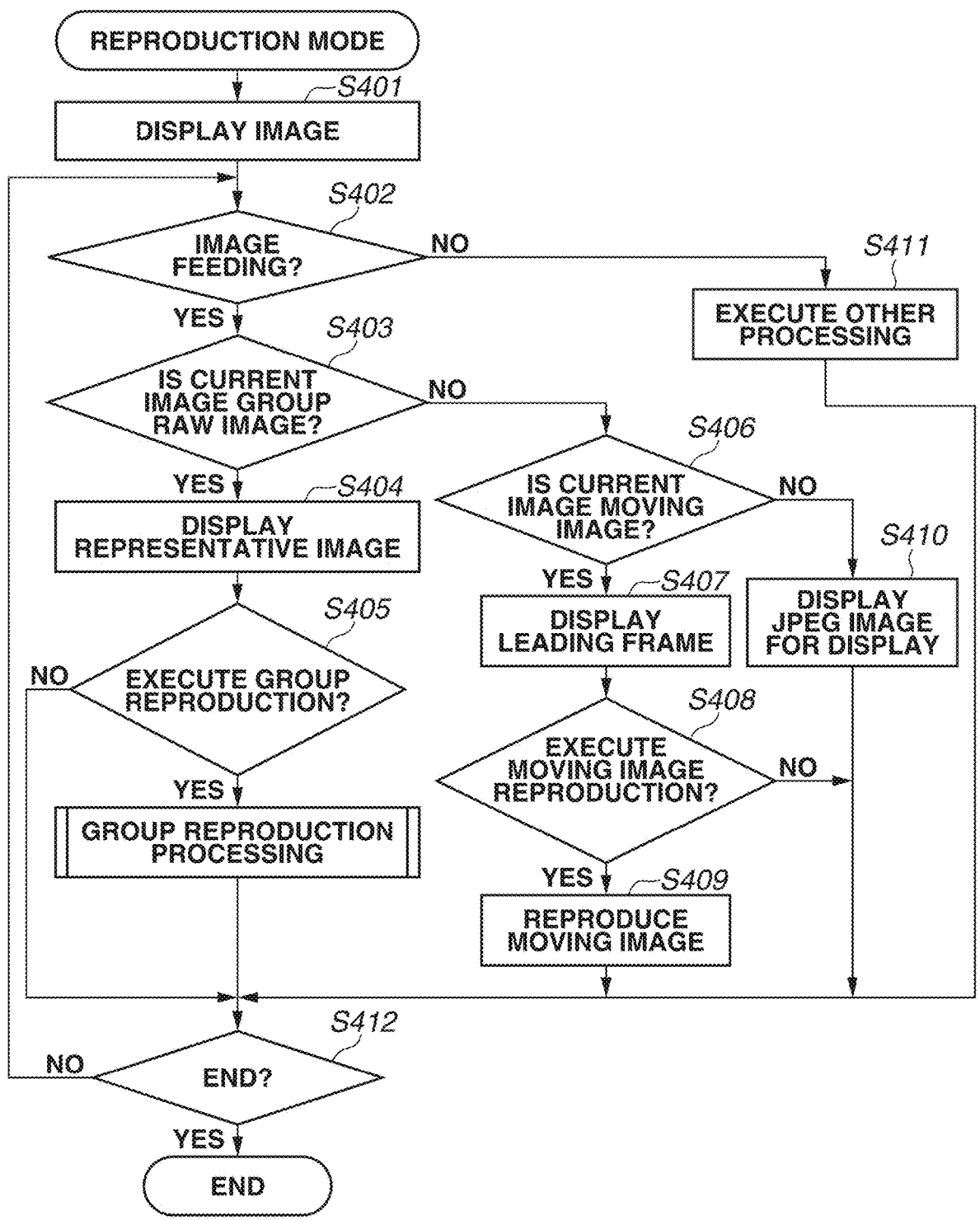
FIG. 4 is a flowchart illustrating a flow of reproduction mode processing of the digital camera.

FIG. 4 is a flowchart in the reproduction mode in an exemplary embodiment.

Each process in this flowchart is implemented by the system control unit 50 loading a program stored in the nonvolatile memory 56, into the memory 32, and executing the program.

In step S401, the system control unit 50 reads an arbitrary image from the recording medium 200, and displays the image on the entire display unit 28. Then, the processing proceeds to step S402.

In step S402, the system control unit 50 determines whether an image feeding operation has been performed. If the image feeding operation has been performed (YES in step S402), the processing proceeds to step S403, and if not (NO in step S402), the processing proceeds to step S411.

In step S403, the system control unit 50 determines whether a data format of the image displayed on the display unit 28 is a data format of a group RAW image. If the data format of the displayed image is a data format of a group RAW image (YES in step S403), the processing proceeds to step S404, and if not (NO in step S403), the processing proceeds to step S406.

In step S404, the system control unit 50 displays a representative image of the group RAW image on the display unit 28 as a single reproduction screen. Hereinafter, the description will be given also using FIGS. 5A to 5E, 6A, 6B, and 8A to 8E. In the state in step S404, a single reproduction screen as illustrated in FIG. 5A is displayed. A representative image 5001 of group RAW data is displayed on the display unit 28. For identifying an image read from the recording medium 200, a file number 502 is displayed on the display unit 28 as an on-screen display (OSD). In addition, a navigation guide 503 is provided for identifying that the displayed image is a group image. In addition, the navigation guide 503 provides guidance also meaning that content of the group can be browsed by pressing a SET button.

The details of a file configuration of group RAW data will now be described using FIG. 8A. As an example, the number of frames of the group RAW data is assumed to be N=60. As described at the beginning, group RAW data is generated by a shutter button being pressed in a predetermined image capturing mode in the image capturing mode. More specifically, in the exemplary embodiment, an image capturing system that employs an electronic shutter is used, and the image capturing system can capture, as a RAW file, images corresponding to 30 frames in one second while the shutter button is being pressed. Because RAW images corresponding to 30 frames are captured in one second, it is often difficult even from the aspect of a CPU processing speed to sequentially perform development processing of the RAW file in image capturing, and convert the RAW file into a Joint Photographic Experts Group (JPEG) format with a high quality size (size: large). In view of the foregoing, in image capturing, the processing is omitted to perform minimum development processing for a JPEG image for display in a smaller size (size: small) than the above-described size. A file generated under such a condition corresponds to a group RAW image illustrated in FIG. 8A. A file configuration of one file includes a JPEG image for display (size: small) of a representative image of the entire group, a JPEG image for display (size: small) of a first frame and RAW data thereof, a JPEG image for display (size: small) of a second frame and RAW data thereof, a JPEG image for display (size: small) of a third frame and RAW data thereof, and so on, and lastly includes a JPEG image for display (size: small) of a sixtieth frame and RAW data thereof. In other words, the group RAW data is obtained by continuously pressing a shutter button for two seconds in image capturing, and the image displayed in FIG. 5A corresponds to the representative image illustrated in FIG. 8A. The images for display of the first frame and the second frame will be described in the undermentioned group reproduction processing. Then, the processing proceeds to step S405.

In step S405, the system control unit 50 determines whether an instruction to execute group reproduction has been issued. In this step, the instruction to execute group reproduction can be issued by pressing the SET button as indicated by the navigation guide 503. The system control unit 50 determines that the instruction to execute group reproduction has been issued, in response to the detection of an operation performed on the SET button, and the processing proceeds to the group reproduction processing. Alternatively, the group reproduction processing may be executed in response to the detection of a touch performed on the navigation guide 503 on the single reproduction screen illustrated in FIG. 5A. In this manner, if the execution of group reproduction has been instructed (YES in step S405), the processing proceeds to the group reproduction processing, and if not (NO in step S405), the processing proceeds to step S412. The group reproduction processing will be described in detail using the undermentioned flowchart illustrated in FIG. 7.

In step S406, the system control unit 50 determines whether the arbitrary image displayed on the display unit 28 is a moving image. If the arbitrary image is a moving image (YES in step S406), the processing proceeds to step S407, and if not (NO in step S406), the processing proceeds to step S410.

In step S407, the system control unit 50 displays a leading frame of a moving image file on the display unit 28 as a single reproduction screen. Then, the processing proceeds to step S408.

In step S408, the system control unit 50 determines whether an instruction to execute moving image reproduction has been issued. If the instruction to execute moving image reproduction has been issued (YES in step S408), the processing proceeds to moving image reproduction processing, and if not (NO in step S408), the processing proceeds to step S412.

In step S409, the system control unit 50 executes the moving image reproduction. A moving image to be reproduced in the moving image reproduction is a moving image with RAW data in some cases, and is a moving image without RAW data in other cases. Then, the processing proceeds to step S412.

In step S410, since the displayed image is neither a moving image nor a group RAW image, the system control unit 50 displays a still JPEG image for display as a single reproduction screen. Then, the processing proceeds to step S412.

In step S411, the system control unit 50 performs processing other than image feeding in the reproduction mode. The other processing sometimes includes processing of enlarging an image, and the execution of a function of erasing an image. Then, the processing proceeds to step S412.

In step S412, the system control unit 50 determines whether to end the reproduction mode. If the reproduction mode is to be ended (YES in step S412), the reproduction mode is ended, and If the reproduction mode is not to be ended (NO in step S412), the processing returns to step S402.

Figure 7:
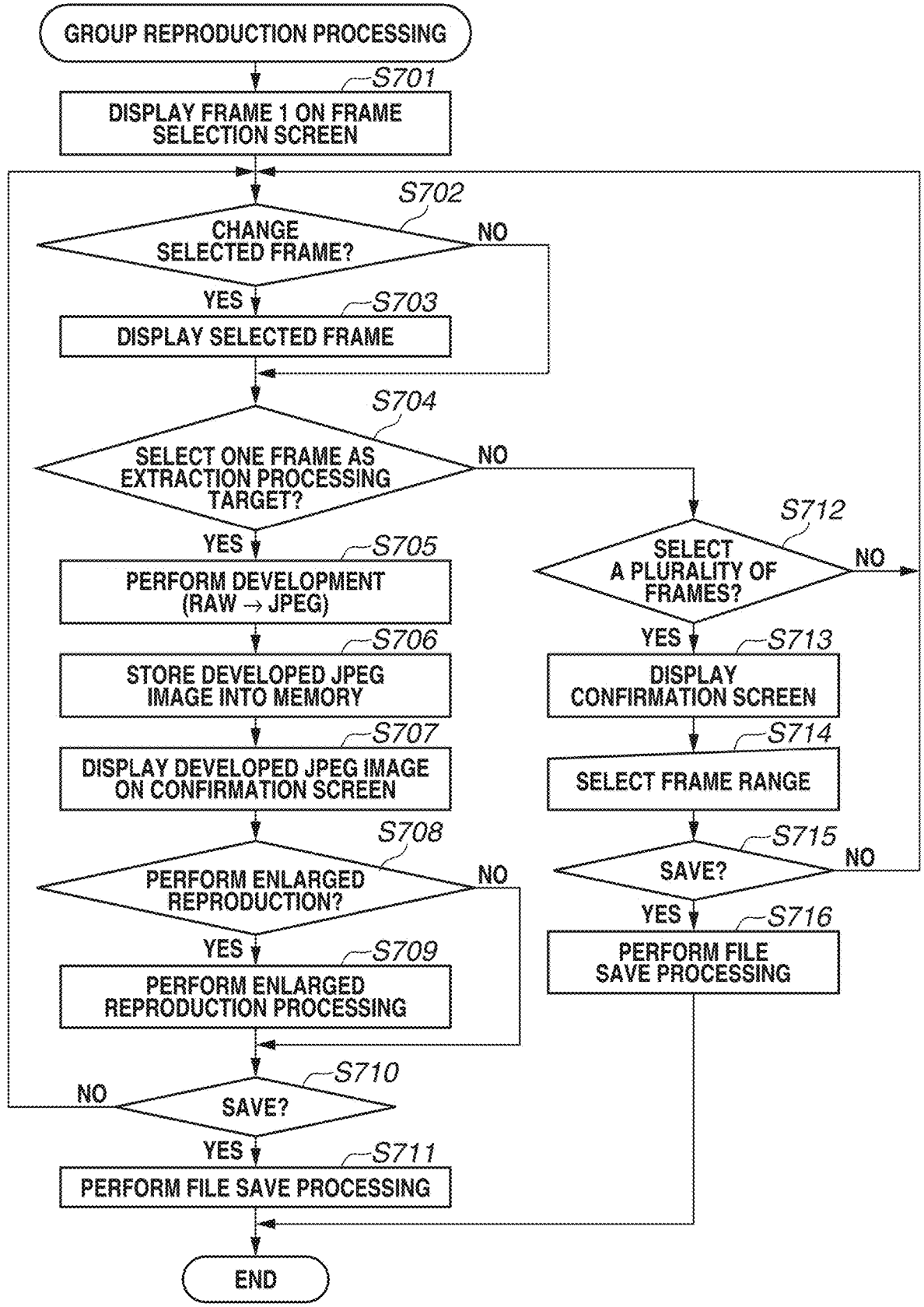
FIG. 7 is a flowchart illustrating a flow of group reproduction processing.

FIG. 7 is a flowchart illustrating the details of the group reproduction processing in the exemplary embodiment. Each process in this flowchart is implemented by the system control unit 50 loading a program stored in the nonvolatile memory 56, into the memory 32, and executing the program.

In step S701, the system control unit 50 displays the first frame of the group RAW image file for which group reproduction has been selected in step S405 (JPEG image for display of a frame 1 in FIG. 8A), on the display unit 28 as a frame selection screen as illustrated in FIG. 5B. Then, the processing proceeds to step S702. On the frame selection screen, images included in the group RAW image file to be processed can be browsed, and one frame to be subjected to extraction processing can be selected in accordance with an operation of the user.

In step S702, the system control unit 50 determines whether an operation for changing a selected frame (display frame) has been performed. If the operation for changing a selected frame has been performed (YES in step S702), in step S703, an image to be displayed on the frame selection screen is changed to the selected frame, and the image is displayed.

The frame selection screen and the change of a selected frame will be described using FIGS. 5B and 5C.

FIG. 5B illustrates a display state caused when the screen transitions to the frame selection screen in step S701. When the screen transitions to the frame selection screen, the first frame of the group RAW image is displayed. In the present exemplary embodiment, an image of the first frame for display and an image of a representative image for display are the same. Thus, on the frame selection screen illustrated in FIG. 5B, the JPEG image for display of the frame 1 in FIG. 8A is displayed as a display image 5002. A navigation guide 505 in FIG. 5B is an execution guide for extracting only one frame displayed on the display unit 28. By performing a touch operation 504 on this portion, it is possible to extract only the one frame (display image 5002). In addition, unlike the navigation guide 505, a navigation guide 506 is a guide for collectively extracting a plurality of frames at a time, and if a touch operation is performed on this guide, the screen transitions to a multiple frame selection screen illustrated in FIG. 6B. In addition, frame feeding/return buttons 508 provided in lower parts of the screen are touch buttons that enable frame feeding/return by the touch operation 504. If a touch operation is performed on the right frame feeding button 508, the frame can proceed to the next frame. In contrast, if the left frame return button 508 is operated, the frame can be returned to an immediately-preceding frame. In addition, by touching a pointer 509-1 provided on a seek bar 509 and indicating a position of a frame being currently displayed, and then performing a drag operation, it is possible to change a frame to be displayed on the frame selection screen. In other words, in step S702, an operation performed on the frame feeding/return button 508 or the pointer 509-1 is detected, and if a touch operation is performed on any of these operation items, an image to be displayed on the frame selection screen is changed. Information display 507 indicates how many frame(s) of a group (a total number of frames) is being browsed. Since the total number of frames is 60 and the first frame is currently being browsed in this state, "1/60" is displayed.

When a touch operation is performed on the frame feeding button 508 on the frame selection screen illustrated in FIG. 5B, the frame is fed from the first frame to the second frame. At this time, "2/60" is displayed as the information display 507. Then, an image displayed on the frame selection screen becomes a JPEG image for display of a frame 2 illustrated in FIG. 8A. In addition, because the JPEG image for display that is displayed on the frame selection screen in step S703 is an image having a small size, smooth frame selection is enabled. FIG. 5C illustrates a state in which 15 frames are selected from among 60 frames in the group RAW image file, and a JPEG image for display of the fifteenth image is displayed on the frame selection screen as a display image 5003.

In step S704, the system control unit 50 determines whether one frame has been selected on the frame selection screen as a frame to be subjected to extraction processing. More specifically, if the SET button has been operated or the navigation guide 505 has been touched in a state in which the selected frame is displayed on the frame selection screen, it is determined that one frame has been selected as a frame to be subjected to extraction processing. If one frame has been selected (YES in step S704), the processing proceeds to step S705, and if not (NO in step S704), the processing proceeds to step S712.

In step S705, the system control unit 50 reads out, from the recording medium 200, RAW data in the group RAW image file that corresponds to the frame selected on the frame selection screen as an extraction processing target, and performs development processing on the read RAW image using the image processing unit 24. By the development processing, a developed JPEG image (size: large) having a larger resolution than a JPEG image for display is generated. In addition, in step S705, not only the development processing but also processing of converting developed image data into a JPEG format is performed. In step S706, the system control unit 50 temporarily stores, into the memory 32, the JPEG image generated in step S705. Then, in step S707, the system control unit 50 displays the frame selected on the frame selection screen as an extraction processing target, in a higher image quality state than that on the frame selection screen, and displays, on the display unit 28, a confirmation screen for asking the user whether to execute extraction processing. On the confirmation screen, a display image that is based on the developed JPEG image generated in step S705 is displayed.

The confirmation screen will be described using FIG. 5D. First of all, the details of the development processing will be described. On the frame selection screen, the display image displayed on the display unit 28 is a JPEG image for display (size: small) corresponding to the frame selected from among a plurality of images recorded in the group RAW image file illustrated in FIG. 8A. If an operation instruction for extracting the frame being displayed, as one image, is detected in step S704, RAW data corresponding to the frame selected from among the plurality of images recorded in the group RAW image file illustrated in FIG. 8A is to be subjected to the development processing in step S705. In step S705, the development processing is performed based on an image capturing parameter included in the RAW data. The development processing is performed in such a manner that the resultant image has a size with a larger resolution than a size of the display image 5003 and the JPEG image for display that is recorded in the group RAW image file, the image is converted into a JPEG format, and the developed JPEG image is generated. Then, a display image (JPEG image) 5004 that is based on the developed JPEG image is displayed as a confirmation screen. As illustrated in FIG. 5D, aside from the display image 5004, execution guides and the like are displayed on the confirmation screen. The execution guides refer to an enlargement guide 510 and guides for save (JPEG save execution 511, RAW save execution 512, and cancel 513). In other words, it is illustrated that, on the confirmation screen, if an enlargement operation is performed, the enlargement of the image can be performed, and if save is executed by touching a save guide, the processing can shift to save processing of extracting a selected frame and saving the frame as a new image file. After the confirmation screen is displayed in step S707, the processing proceeds to step S708.

In step S708, the system control unit 50 determines whether an enlargement operation for performing enlargement processing has been performed. In other words, the system control unit 50 determines whether the enlargement guide 510 has been touched. If the operation for performing enlargement processing has been performed (YES in step S708), the processing proceeds to step S709, and if not (NO in step S708), the processing proceeds to step S710.

Figure 6A:
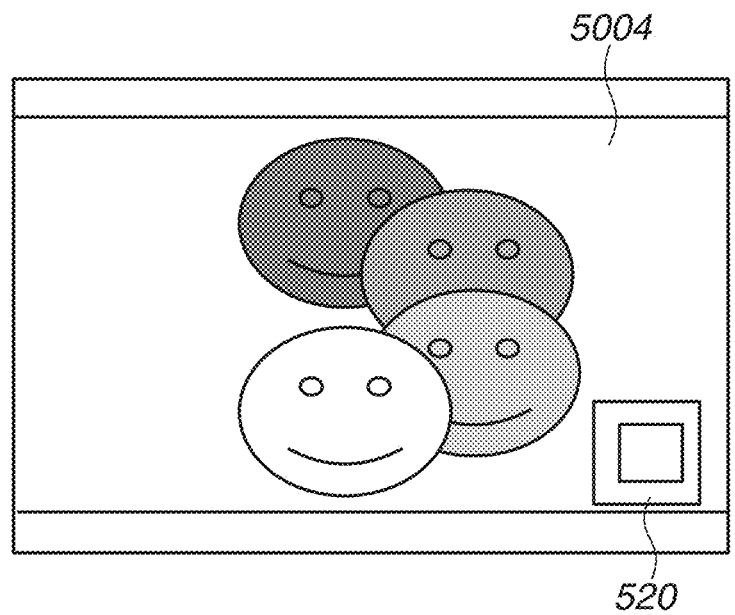
FIGS. 6A and 6B are diagrams illustrating screens in the reproduction mode.

In step S709, the system control unit 50 performs enlarged reproduction processing. The enlarged reproduction processing displays (enlarged display) the JPEG image 5004 generated in step S704 described above, and stored in the memory 32, on the display unit 28 in an enlarged state as illustrated in FIG. 6A. Since the JPEG image 5004 is generated by performing high quality development, the JPEG image 5004 is suitable for confirming whether the image is in focus. For indicating that the image in an enlarged reproduction state, an enlarged position indicator 520 is displayed on the display unit 28. Then, the processing proceeds to step S710. On the frame selection screen, enlarged display is disabled since an image is displayed using an image for display that has a small size. In contrast, on the frame confirmation screen, because an image is displayed using a high quality developed JPEG image, enlarged display is enabled.

In step S710, the system control unit 50 extracts the one frame selected in step S702, and determines whether to perform file save. If a touch operation on a save guide is detected on the frame confirmation screen (YES in step S710), the processing proceeds to step S711 for performing file save, and if not (NO in step S710), the processing returns to step S702.

In step S711, the system control unit 50 performs file save processing by extracting one frame selected on the frame selection screen, and recording the frame as a new image file. The details of the file save processing to be performed in this step will be described.

First of all, processing to be performed when the RAW save execution 512 is selected will be described. Data to be included in a RAW image file to be newly created includes the developed JPEG image that has been developed in step S705 from RAW data and temporarily stored into the memory 32 in step S706, and RAW data of an extraction processing target frame selected on the frame selection screen. In other words, when the RAW save execution 512 is selected, the system control unit 50 reads out RAW data of an extraction processing target frame in a group RAW image file from the recording medium 200. The system control unit 50 also reads out the developed JPEG image temporarily stored in the memory 32. A new RAW image file is generated from the processing target RAW data and the developed JPEG image that have been read out and recorded onto the recording medium 200. The RAW image file newly generated by the frame extraction of the developed JPEG image has a configuration as illustrated in FIG. 8C. The developed JPEG image temporarily stored in the memory 32 is recorded as a JPEG image for display in the newly generated RAW image file. Since development processing is not newly performed when a RAW image file is generated for frame extraction, file save processing does not take time. In addition, the recorded JPEG image for display has a higher resolution than that of an image included in the group RAW image file as illustrated in FIG. 8A. If the file save processing ends, the group reproduction processing ends. If the group reproduction ends, the JPEG image for display (size: large) of the RAW image file (FIG. 8C) recorded in the file save processing in step S711 is displayed on the display unit 28 as a single reproduction screen as illustrated in FIG. 5E.

In step S712, the system control unit 50 determines whether an operation of selecting a plurality of frames has been performed on the frame selection screen. If a touch operation has been performed on the navigation guide 506 on the frame selection screen, the system control unit 50 determines that an operation of selecting a plurality of frames has been performed on the frame selection screen (YES in step S712), and the processing proceeds to step S713, if not (NO in step S712), the processing returns to step S702.

Figure 6B:
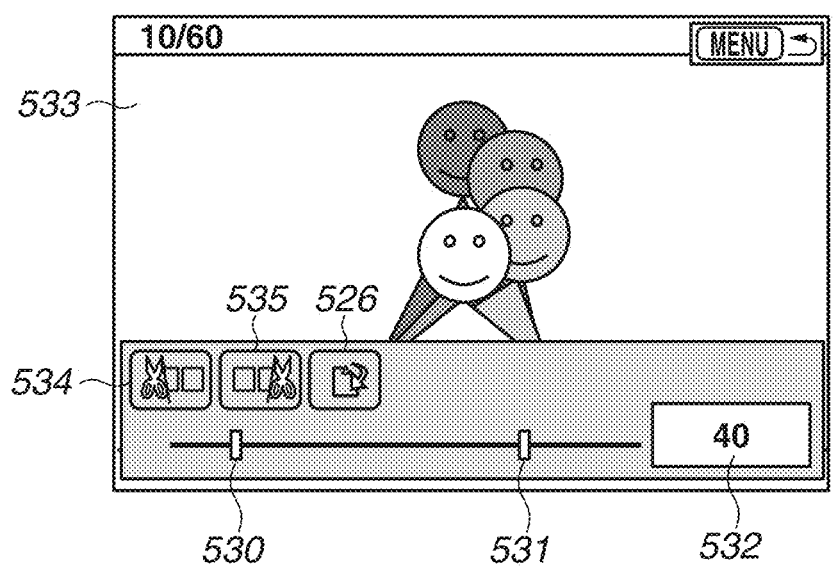

In step S713, the system control unit 50 displays, on the display unit 28, a multiple frame selection screen for selecting a plurality of frames, as illustrated in FIG. 6B. FIG. 6B illustrates the multiple frame selection screen. By designating frames at a starting point and an end point from frames in the group RAW image file in accordance with touch operations performed on the multiple frame selection screen by the user, a plurality of frames included in the frame range defined by the designated frames can be designated as an extraction target frame range. In step S714, the system control unit 50 receives the selection of the frame range in accordance with a touch operation performed by the user. An operation method of frame range selection will be described. If a touch operation is performed on an anterior frame designation button 534 on the multiple frame selection screen, an indicator needle 530 enters an in-focus state, and then, by moving the indicator needle 530 by a touch operation, a starting point frame is selected. In this example, a frame 11 is set as the starting point frame. In a similar manner, if a touch operation is performed on a posterior frame designation button 535 on the multiple frame selection screen, an indicator needle 531 enters an in-focus state, and by moving the indicator needle 531 by a touch operation, an end point frame is selected. In this example, a frame 50 is set as the end point frame. At this time, the number of frames included in the frame range defined by the starting point frame and the end point frame is 40. In other words, FIG. 6C illustrates a state in which 40 frames are selected. Information display 532 indicates that the number of selected frames is 40. Then, after the selection of the frame range has been received from the user, the processing proceeds to step S715.

In step S715, the system control unit 50 determines whether an operation of extracting the plurality of frames selected in step S714, and performing file save has been performed. If the operation of performing file save has been performed (YES in step S715), the processing proceeds to step S716, and if not (NO in step S715), the processing returns to step S702. The operation of performing file save corresponds to a touch operation performed on a save button 526 illustrated in FIG. 6B.

In step S716, the system control unit 50 extracts the plurality of frames selected in step S714, and performs file save processing. The details of the file save processing to be performed in this step will be described. Data to be included in a file includes JPEG images for display and RAW data that correspond to frames from a starting point frame (the frame 11 in the case of FIG. 6B) to an end point frame (the frame 50 in the case of FIG. 6B) as illustrated in FIG. 8D. In addition, the JPEG image for display of the starting point frame is copied and used as a representative image. In this manner, the save processing in step S715 differs from the save processing in step S711, and a flow of processes up to the save processing in step S715 differs from a flow of processes (development in step S705, etc.) up to the save processing in step S711. More specifically, development processing is not performed, and only processing of detaching data corresponding to the plurality of frames designated in step S714, from the data illustrated in FIG. 8A (plus copy of representative image) is performed, and the resultant data is recorded as a new group RAW image file. Then, if the file save processing ends, the group reproduction processing ends. If the group reproduction ends, a representative image of the group RAW image file that has been recorded in the file save processing 2 in step S716 is displayed on the display unit 28 as a single reproduction screen.

A group RAW image does not include a high quality JPEG image as an image for display because there is not sufficient time for performing development processing during image capturing as described above. Thus, if one frame is selected and a file is generated without performing development processing, a RAW image only includes an image for display (size: small) and RAW data of the selected frame as illustrated in FIG. 8B. With such data, a high quality image for display cannot be generated unless RAW development of the extracted RAW data is further performed in another flow. Thus, the number of operation procedures for enlarging an image and confirming whether the image is in focus increases. In particular, when one frame is to be extracted and recorded, a RAW image of the frame is useful in a group RAW image, and in this case, the RAW image is desired to be used as one image, and the image is often desired to be confirmed using a high quality image. For this reason, when a frame is extracted to be subjected to a process of save processing, development processing is performed from RAW data corresponding to a frame to be extracted, as in step S705. At this time, it is possible to simultaneously perform development and file save in step S705. Nevertheless, if processing up to file save is executed at a time, in some cases, an out-of-focus state may be noticed after the confirmation of an image, and an out-of-focus image may be extracted. In these cases, the number of returning procedures increases. Thus, as in steps S705 and S711, the timings of development processing and file save processing are separated. Moreover, during the processes of the development processing and the file save processing, a confirmation screen developed at high quality is displayed, and furthermore, enlarged reproduction is performed on the confirmation screen so that the details of the image can be confirmed. Then, in file save, the image is replaced with the high quality image generated in the preceding development processing. In other words, an image generated in the development processing and stored in the memory becomes the same as an image for display that is used after the file save. With this configuration, image quality can be confirmed before file save. The user therefore becomes less likely to extract an unintended frame, and wasted processing time can be reduced.

As described above, by implementing the exemplary embodiment in accordance with the flowcharts illustrated in FIGS. 4 and 7, smooth operation can be performed in frame selection, and image quality can be confirmed before file save. Thus, a possibility of extracting an unintended frame decreases. In addition, because a high quality image generated in the confirmation is recorded as a representative image (image for display) of a new file, the following advantages are obtained. More specifically, redundant processing for generating a representative image is eliminated, and a processing time becomes shorter.

In addition, the aforementioned file save processing in step S711 has been described assuming that the RAW save execution 512 is selected in the selection in step S710, but JPEG save may be enabled (the aforementioned JPEG save execution 511 may be selected). The file save processing to be performed when JPEG save is selected is simpler than the file save processing to be performed when RAW save is selected, and a JPEG image for display temporarily stored in the memory 32 is copied and saved. The file configuration is illustrated in FIG. 8E. This configuration is advantageous because it takes less time for the file save processing than that in the aforementioned prior art.

It has been described that high quality development is not performed if a plurality of frames is selected. A main use case of extracting a group RAW image in a plurality of ranges is the deletion of an unnecessary frame. An anterior half or a posterior half of 60 frames often includes unintended frames. Since the group RAW image includes RAW data in all the frames, there is a high possibility that a file size becomes enormous. The user is therefore highly likely to consider that a file size is desirably reduced as much as possible and a storage medium is desirably saved. In other words, in a case where the selection of a plurality of frames (extraction of a plurality of frames) is performed, it is less likely that a focus state of each frame is confirmed one by one. Thus, development processing of generating a high quality image is not performed.

While processing of extracting a frame from a group RAW image has been described in the present exemplary embodiment, similar processing may be applied also to a RAW file of a moving image.

In the present exemplary embodiment, when one frame is selected, extracted, and saved, a RAW image file to be saved is generated from RAW data of the frame and a developed JPEG image (size: large) obtained by developing the RAW data. In generating a developed JPEG image, development processing is desirably performed so as to increase a resolution and furthermore, to make the image quality higher than that of an image for display (size: small) recorded in a group RAW image file. In addition, in the present exemplary embodiment, RAW data and a developed JPEG image (size: large) are recorded in a RAW image file, and an image for display (size: small) recorded in a group RAW image file is not recorded in a RAW image file. Nevertheless, an image for display (size: small) may be further recorded.

In the present exemplary embodiment, a developed JPEG image obtained by developing RAW data and converting the RAW data into a JPEG format in step S705 is temporarily saved into the memory 32 in step S706, and the developed JPEG image temporarily saved in the memory 32 is recorded in a RAW image file in step S711. Alternatively, the flow may be performed in the following manner More specifically, developed image data is temporarily saved into the memory 32 in step S706 without performing conversion into a JPEG format in step S705, and in step S711, the developed image data in the memory 32 is converted into a JPEG format and then recorded into a RAW image file.

In the present exemplary embodiment, the processes from steps S705 to S711 are performed only when one frame is selected. Nevertheless, even when a plurality of frames is selected, a high quality JPEG image is desired to be generated in some cases. Thus, even when a plurality of frames is selected, or also when the number of selected frames is small, the processes from steps S705 to S711 may be performed. If the processes from steps S705 to S711 are performed even when a plurality of frames is selected, development processing in step S705 and temporary save into the memory 32 in step S706 are performed for each of the selected frames. Since it is necessary to temporarily save developed JPEG images into the memory 32, when a plurality of frames is selected, the number of frames on which the processes from steps S705 to S711 can be executed is desirably set to be smaller than the number of developed JPEG images that can be saved into the memory 32. For example, the processes may be selectively performed in the following manner. In step S704, the number of selected frames and a predetermined number are compared, and if the number of selected frames is smaller than the predetermined number, the processes from steps S705 to S711 are performed, and if the number of selected frames is equal to or larger than the predetermined number, the processes from steps S713 to S716 are performed.

As described above, according to the present disclosure, a smooth operation can be performed in frame selection and image quality can be confirmed in an enlarged state before file save. This configuration brings about the following advantages. More specifically, a possibility of extracting an unintended frame decreases, and a total time used for selection, extraction, and confirmation is shortened.

Exemplary embodiments of the present disclosure have been described in detail, but embodiments are not limited to these specific exemplary embodiments, and various configurations are also encompassed in the present disclosure without departing from the scope of the present disclosure. Furthermore, each of the aforementioned exemplary embodiments merely indicates an exemplary embodiment, and the exemplary embodiments can be appropriately combined.

In the aforementioned exemplary embodiments, an example of a case where the present disclosure is applied to a digital camera has been described. Nevertheless, the application of the present disclosure is not limited to the example, and the present disclosure can be applied to a display control apparatus that can display a plurality of images and supports a touch input. More specifically, the present disclosure can be applied to a personal computer, a personal digital assistance (PDA), a portable phone terminal, a portable image viewer, a printer apparatus including a display, a digital photo frame, a music player, a game apparatus, an electronic book reader, or the like.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-184792, filed Sep. 28, 2018, which is hereby incorporated by reference herein in its entirety.

What is claimed is:

1. An image processing apparatus comprising:
a processor; and
a memory coupled to the processor storing instructions that, when executed by the processor, cause the processor to function as:
a readout control unit configured to read out an image from a recording medium on which a first image file is recorded, the first image file including a plurality of images having a first format, and a plurality of images with a first resolution that respectively corresponds to the plurality of images of the first format;
a first display control unit configured to cause a display unit to display a selection screen for selecting a processing target image from among a plurality of images in the first image file, wherein an image that is based on an image with the first resolution is displayed on the selection screen;
a second display control unit configured cause the display unit to display a confirmation screen for confirming the processing target image, in accordance with the processing target image being selected on the selection screen; and
a recording control unit configured to perform control to extract an image having the first format and corresponding to the processing target image, from the first image file, and to record the extracted image onto the recording medium as a second image file, in accordance with extraction of the processing target image being selected on the confirmation screen,
wherein the second display control unit performs control to generate an image with a second resolution higher than the first resolution, from the image having the first format and corresponding to the processing target image, and to display an image that is based on the image with the second resolution, on the confirmation screen, and
wherein the recording control unit performs control to record, as the second image file, the image having the first format and corresponding to the processing target image that has been extracted from the first image file, and the image with the second resolution that has been generated to be displayed on the confirmation screen.

2. The image processing apparatus according to claim 1, wherein the image having the first format is a RAW image.

3. The image processing apparatus according to claim 1, wherein the image with the first resolution and the image with the second resolution are images having a JPEG format.

4. The image processing apparatus according to claim 1, wherein the recording control unit controls not to record the image with the first resolution in the first image file in the second image file.

5. The image processing apparatus according to claim 1, further comprising an enlarged display unit configured to perform, on the confirmation screen, enlarged display of an image being displayed, in accordance with a predetermined operation.

6. The image processing apparatus according to claim 5, wherein enlarged display is disabled on the selection screen.

7. The image processing apparatus according to claim 1, wherein, in a case where one image is selected as the processing target image, the recording control unit performs control to record, as the second image file, the image having the first format and corresponding to the processing target image that has been extracted from the first image file, and the image with the second resolution that has been generated to be displayed on the confirmation screen, and in a case where a plurality of images is selected as the processing target image, the recording control unit performs control not to record the image with the second resolution, and to extract the image having the first format and corresponding to the processing target image, and the image with the first resolution, from the first image file, and to record the extracted images as the second image file.

8. The image processing apparatus according to claim 1, wherein, in a case where the number of images selected as the processing target image is smaller than a predetermined number, the recording control unit performs control to record, as the second image file, the image having the first format and corresponding to the processing target image that has been extracted from the first image file, and the image with the second resolution that has been generated to be displayed on the confirmation screen, and in a case where the number of images selected as the processing target image is equal to or larger than the predetermined number, the recording control unit performs control not to record the image with the second resolution, and to extract the image having the first format and corresponding to the processing target image, and the image with the first resolution, from the first image file, and to record the extracted images as the second image file.

9. A control method of an image processing apparatus, the control method comprising:
reading out an image from a recording medium on which a first image file is recorded, the first image file including a plurality of images having a first format and a plurality of images with a first resolution that respectively corresponding to the plurality of images;
causing a display unit to display a selection screen for selecting a processing target image from among a plurality of images in the first image file, and causing an image that is based on an image with the first resolution, to be displayed on the selection screen;
causing the display unit to display a confirmation screen for confirming the processing target image, in accordance with the processing target image being selected on the selection screen;
performing control to extract an image having the first format and corresponding to the processing target image, from the first image file, and to record the extracted image onto the recording medium as a second image file, in accordance with extraction of the processing target image being selected on the confirmation screen;
performing control to generate an image with a second resolution higher than the first resolution, from the image having the first format and corresponding to the processing target image, and to display an image that is based on the image with the second resolution, on the confirmation screen; and
performing control to record, as the second image file, the image having the first format and corresponding to the processing target image that has been extracted from the first image file, and the image with the second resolution that has been generated to be displayed on the confirmation screen.

10. A non-transitory computer-readable storage medium storing a program for causing a computer to execute the control method of an image processing apparatus according to claim 9.

11. The non-transitory computer-readable storage medium according to claim 10, wherein the image having the first format is a RAW image.

12. The non-transitory computer-readable storage medium according to claim 10, wherein the image with the first resolution and the image with the second resolution are images having a JPEG format.

13. The non-transitory computer-readable storage medium according to claim 10, further comprising performing, on the confirmation screen, enlarged display of an image being displayed, in accordance with a predetermined operation.

14. The non-transitory computer-readable storage medium according to claim 10, further comprising:
performing control to record, as the second image file, the image having the first format and corresponding to the processing target image that has been extracted from the first image file, and the image with the second resolution that has been generated to be displayed on the confirmation screen, in a case where one image is selected as the processing target image; and
performing control not to record the image with the second resolution, and to extract the image having the first format and corresponding to the processing target image, and the image with the first resolution, from the first image file, and to record the extracted images as the second image file, in a case where a plurality of images is selected as the processing target image.

15. The non-transitory computer-readable storage medium according to claim 10, further comprising:
performing control to record, as the second image file, the image having the first format and corresponding to the processing target image that has been extracted from the first image file, and the image with the second resolution that has been generated to be displayed on the confirmation screen, in a case where the number of images selected as the processing target image is smaller than a predetermined number; and
performing control not to record the image with the second resolution, and to extract the image having the first format and corresponding to the processing target image, and the image with the first resolution, from the first image file, and to record the extracted images as the second image file, in a case where the number of images selected as the processing target image is equal to or larger than the predetermined number.

16. The method according to claim 9, wherein the image having the first format is a RAW image.

17. The method according to claim 9, wherein the image with the first resolution and the image with the second resolution are images having a JPEG format.

18. The method according to claim 9, further comprising performing, on the confirmation screen, enlarged display of an image being displayed, in accordance with a predetermined operation.

19. The method according to claim 9, further comprising:
performing control to record, as the second image file, the image having the first format and corresponding to the processing target image that has been extracted from the first image file, and the image with the second resolution that has been generated to be displayed on the confirmation screen, in a case where one image is selected as the processing target image; and
performing control not to record the image with the second resolution, and to extract the image having the first format and corresponding to the processing target image, and the image with the first resolution, from the first image file, and to record the extracted images as the second image file, in a case where a plurality of images is selected as the processing target image.

20. The method according to claim 9, further comprising:
performing control to record, as the second image file, the image having the first format and corresponding to the processing target image that has been extracted from the first image file, and the image with the second resolution that has been generated to be displayed on the confirmation screen, in a case where the number of images selected as the processing target image is smaller than a predetermined number; and
performing control not to record the image with the second resolution, and to extract the image having the first format and corresponding to the processing target image, and the image with the first resolution, from the first image file, and to record the extracted images as the second image file, in a case where the number of images selected as the processing target image is equal to or larger than the predetermined number.

* * * * *